(12) United States Patent
Kuo et al.

(10) Patent No.: US 7,472,066 B2
(45) Date of Patent: Dec. 30, 2008

(54) AUTOMATIC SPEECH SEGMENTATION AND VERIFICATION USING SEGMENT CONFIDENCE MEASURES

(75) Inventors: Chih-Chung Kuo, Hsinchu (TW); Chi-Shiang Kuo, Yung Kang (TW); Jau-Hung Chen, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 688 days.

(21) Appl. No.: 10/782,955

(22) Filed: Feb. 23, 2004

(65) Prior Publication Data
US 2005/0060151 A1    Mar. 17, 2005

(30) Foreign Application Priority Data
Sep. 12, 2003  (TW)  ............................... 92125187 A

(51) Int. Cl.
G10L 13/06  (2006.01)
G10L 13/00  (2006.01)
(52) U.S. Cl. ...................... 704/266; 704/258; 704/260; 704/267
(58) Field of Classification Search .................. 704/254, 704/258, 266, 9, 10, 260, 267
See application file for complete search history.

(56) References Cited

U.S. PATENT DOCUMENTS

| | | | | |
|---|---|---|---|---|
| 4,783,811 A | * | 11/1988 | Fisher et al. ................. | 704/266 |
| 5,199,077 A | * | 3/1993 | Wilcox et al. ................ | 704/256 |
| 5,675,706 A | * | 10/1997 | Lee et al. ..................... | 704/256 |
| 6,125,345 A | * | 9/2000 | Modi et al. .................. | 704/240 |
| 6,292,778 B1 | * | 9/2001 | Sukkar ..................... | 704/256.4 |
| 6,456,697 B1 | | 9/2002 | Chang et al. | |
| 6,535,851 B1 | * | 3/2003 | Fanty et al. ................. | 704/249 |
| 6,684,187 B1 | * | 1/2004 | Conkie ......................... | 704/260 |
| 6,871,178 B2 | * | 3/2005 | Case et al. ................... | 704/260 |
| 7,010,481 B2 | * | 3/2006 | Takizawa ..................... | 704/220 |
| 2003/0187647 A1 | * | 10/2003 | Conkie et al. ............... | 704/258 |
| 2003/0195743 A1 | * | 10/2003 | Kuo et al. .................... | 704/207 |

(Continued)

OTHER PUBLICATIONS

Toledano, D. Torre et al., "Trying to Mimic Segmentation of Speech Using HMM and Fuzzy Logic Post-Correction Rules," 1998, Proc. Third ESCA/COCOSDA Workshop on Speech Synthesis.*

(Continued)

Primary Examiner—Talivaldis Ivars Smits
Assistant Examiner—Douglas C Godbold
(74) Attorney, Agent, or Firm—Bacon & Thomas, PLLC

(57) ABSTRACT

An automatic speech segmentation and verification system and method is disclosed, which has a known text script and a recorded speech corpus corresponding to the known text script. A speech unit segmentor segments the recorded speech corpus into N test speech unit segments referring to the phonetic information of the known text script. Then, a segmental verifier is applied to obtain a confidence measure of syllable segmentation for verifying the correctness of the cutting points of test speech unit segments. A phonetic verifier obtains a confidence measure of syllable verification by using verification models for verifying whether the recorded speech corpus is correctly recorded. Finally, a speech unit inspector integrates the confidence measure of syllable segmentation and the confidence measure of syllable verification to determine whether the test speech unit segment is accepted or not.

18 Claims, 3 Drawing Sheets

U.S. PATENT DOCUMENTS

2005/0027531 A1* 2/2005 Gleason et al. ............. 704/260
2005/0228664 A1* 10/2005 Zhao et al. ................. 704/245

OTHER PUBLICATIONS

Chih-Chung Kuo et. al., *Automatic Speech Segmentation and Verification for Concatenative Synthesis*, Sep. 2003, pp. 1-4, Eurospeech 2003, Switzerland.

R. E. Donovan et. al., *A hidden Markov-model-based trainable speech synthesizer*, Apr. 1999, pp. 1-19, Computer Speech and Language, Cambridge, U.K.

Fu-chiang Chou et. al., *Corpus-Based Mandarin Speech Synthesis With Contextual Syllabic Units Based On Phonetic Properties*, IEEE, 1998, pp. 893-896.

Rafid A. Sukkar et. al., *Vocabulary Independent Discriminative Utterance Verification for Nonkeyword Rejection in Subword Based Speech Recognition*, IEEE Transactions on Speech And Audio Processing, vol. 4, No. 6, Nov. 1996, pp. 420-429.

Andrej Ljolje et. al., *Automatic Speech Segmentation for Concatenative Inventory Selection*, 1996, pp. 305-311.

* cited by examiner

AUTOMATIC SPEECH SEGMENTATION AND VERIFICATION USING SEGMENT CONFIDENCE MEASURES

BACKGROUND OF THE INVENTION

1. Field of the Invention

The present invention relates to the technical field of speech synthesis and, more particularly, to an automatic speech segmentation and verification method and system.

2. Description of Related Art

Currently, in the technical field of speech synthesis, the concatenative synthesis based on a large speech corpus has become a popular approach to speech synthesis system because of the high acoustical quality and natural prosody that is provided. The key issues of speech synthesis systems include the number of synthesis units, the quality of the recorded material, the decision and selection of synthesis unit types, and the generation of natural rhyme and conjunction of synthesis units. Due to improvements in computer processing abilities, and the ubiquity of high capacity hard discs, the prior art speech synthesis system stores thousands of synthesis units to find proper synthesis units.

In the prior art speech synthesis method that uses large speech corpus, a main source of the synthesis units is a predetermined recording script, which is recorded by professional technicians with professional recording equipment. The computer system then automatically segments a recorded file according to phonetic information in the recording script to abstract speech units for the speech synthesis system.

However, sometimes the prior art segmentation position is incorrect, and a huge recording script requires performance and recording times, since even a professional technician can make pronunciation errors, insertion errors, and deletion errors, or co-articulation due to excessively quick speech. Since the segmentation positional accuracy and synthesis units' quality and correction directly affects the output speech synthesis quality, it is very important to improve the confidence measure to sieve bad recording material and redo it.

In addition to checking for segmentation errors, human effort is also required to check the consistency between the recorded speech and the phonetic transcription of the text script that was supposed to be read during recording. However, manual detection is laborious and is easily affected by personal reasons, which can cause totally different opinions about the same recording material instead of providing a consistent objective standard.

There are a lot of prior arts in this speech verification technique field, such as U.S. Pat. No. 6,292,778, which uses a speech recognizer and a task-independent utterance verifier to improve the word/phrase/sentence verification ratio. In this technique, the utterance verifier employs subword and anti-subword models to produce the first and second likelihoods for each recognized subword in the input speech. The utterance verifier determines a subword verification score as the log ratio of the first and second likelihoods, and the utterance verifier combines the subword verification scores to produce a word/phrase/sentence verification score, and compares that score to a predetermined threshold. U.S. Pat. No. 6,125,345 uses a speech recognizer to generate one or more confidence measures; the recognized speech output by the speech recognizer is input to the recognition verifier, which outputs one or more confidence measures. The confidence measures output by the speech recognizer and the recognition verifier are normalized and then input to an integrator. The integrator uses a multi-layer perceptron (MLP) to integrate the various confidence measures from the speech recognizer and the recognition verifier, and then determines whether the recognized utterance hypothesis generated by the speech recognizer should be accepted or rejected. U.S. Pat. No. 5,675,706 uses subword level verification and string level verification to determine whether an unknown input speech does indeed contain the recognized keyword, or consists of speech or other sounds that do not contain any of the predetermined recognizer keywords. The subword level verification stage verifies each subword segment in the input speech as determined by a Hidden Markov Model recognizer to determine if that segment consists of the sound corresponding to the subword that the HMM recognizer assigned to that segment. The string level verification stage combines the results of the subword level verification to make the rejection decision for the whole keyword.

However, the aforesaid patents are used for phonetic verification, which is also used for recognizing the phonetic section of "unknown" text content, not a "known" text content used in speech corpus. Furthermore, the phonetic verification is mainly used for solving out of vocabulary (OOV) problems. But the speech synthesis technique of speech corpus needs to insure that the recording and segmentation of every phonetic unit is correct; moreover, a target for the phonetic verification can be a word, a phase, or a sentence, which is different from a normal standard target (such as a syllable) for the speech synthesis technique of speech corpus.

Therefore, it is desirable to provide an automatic speech segmentation and verification method and related system to mitigate and/or obviate the aforementioned problems.

SUMMARY OF THE INVENTION

The object of the present invention is to provide an automatic speech segmentation and verification method and system which integrates an analysis process of a confidence measure for the segmentation verification (CMS) and a confidence measure for the syllable verification (CMV) to obtain a correct cutting position and to sieve incorrect recording material, which improves the output quality of the speech synthesis system. Another object of the present invention is to provide an automatic speech segmentation and verification method and system which automatically collects synthesis units without human effort.

To achieve these objectives, the automatic speech segmentation and verification method of the present invention first retrieves a recorded speech corpus, which corresponds to a known text script, wherein the known text script defines phonetic information with N phonetic units. Next, it segments the recorded speech corpus into N test speech unit segments referring to the phonetic information of the N phonetic units in the known text script. Then, it verifies segment confidence measures of N cutting points of the test speech unit segments to determine if the N cutting points of the test speech unit segments are correct; and verifies phonetic confidence measures of the test speech unit segments to determine if the test speech unit segments correspond to the known text script. Finally, it determines acceptance of the phonetic unit by comparing a combination of segment reliability and the phonetic confidence measures of the test speech unit segments to a predetermined threshold value; wherein if the combined confidence measure is greater than the predetermined threshold value, the phonetic is accepted.

The automatic speech segmentation and verification system of the present invention includes a database, a speech unit segmentor, a segmental verifier, a phonetic verifier, and a speech unit inspector. The database stores a known text script and a recorded speech corpus corresponding to the known text script, and the known text script has phonetic information with N speech unit segments (N being a positive integer). The speech unit segmentor segments the recorded speech corpus into N test speech unit segments referring to the phonetic information of the known text script. The segmental verifier verifies the correctness of the cutting points of test speech unit segments to obtain a segmental confidence measure. The phonetic verifier obtains a confidence measure of syllable verification by using verification models for verifying whether the recorded speech corpus is correctly recorded. The speech unit inspector integrates the confidence measure of syllable segmentation and the confidence measure of syllable verification to determine whether the test speech unit segment is accepted or not.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
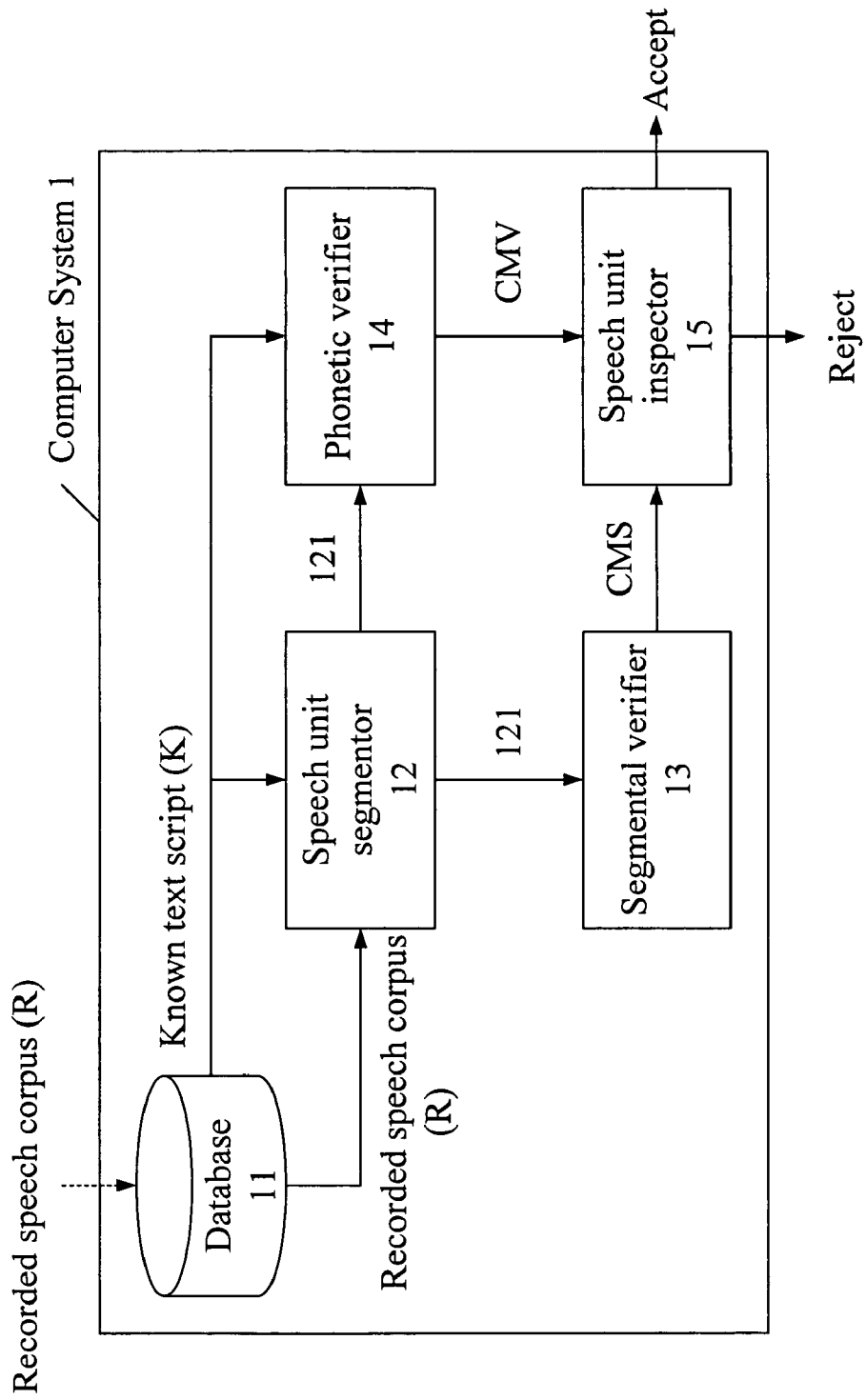
FIG. 1 is a functional block drawing of a preferred embodiment according to the present invention.

An automatic speech segmentation and verification method and system disclosed in the present invention can be applied in establishing a speech synthesis unit of a corpus-based text-to-speech (TTS) system or any other similar application. Please refer to FIG. 1. FIG. 1 is a functional block drawing of a preferred embodiment according to the present invention. The drawing shows the preferred embodiment of the present invention as applied in a computer system 1 to perform segmenting and speech verification to a recorded speech corpus R corresponding to a known text script K. The computer system 1 comprises a database 11, a speech unit segmentor 12, a segmental verifier 13, a phonetic verifier 14, and a speech unit inspector 15 that is used for integrating the confidence measure of syllable segmentation (CMS) and the confidence measure of syllable verification (CMV) to determine whether the test speech unit segment is accepted or not. The database is used for storing the known text script K and the recorded speech corpus R; the known text script K has phonetic information with N speech unit segments, and the recorded speech corpus R is recorded by a professional operator according to known text script K.

The following embodiment will take a Mandarin speech corpus as an example. Mandarin is a language of monosyllables, in which each Chinese character corresponds to a syllable. Therefore, it's natural and convenient to choose the syllable as the basic synthesis unit (also the speech unit segment). Phonologically, a Mandarin syllable is composed of an optional initial followed by a final. The phonemic categories of initials include nasals, liquids, stops, fricatives, and affricates. The speech unit segment can also be a signal phone, a di-phone, a root, a prefix or a word.

Figure 2:
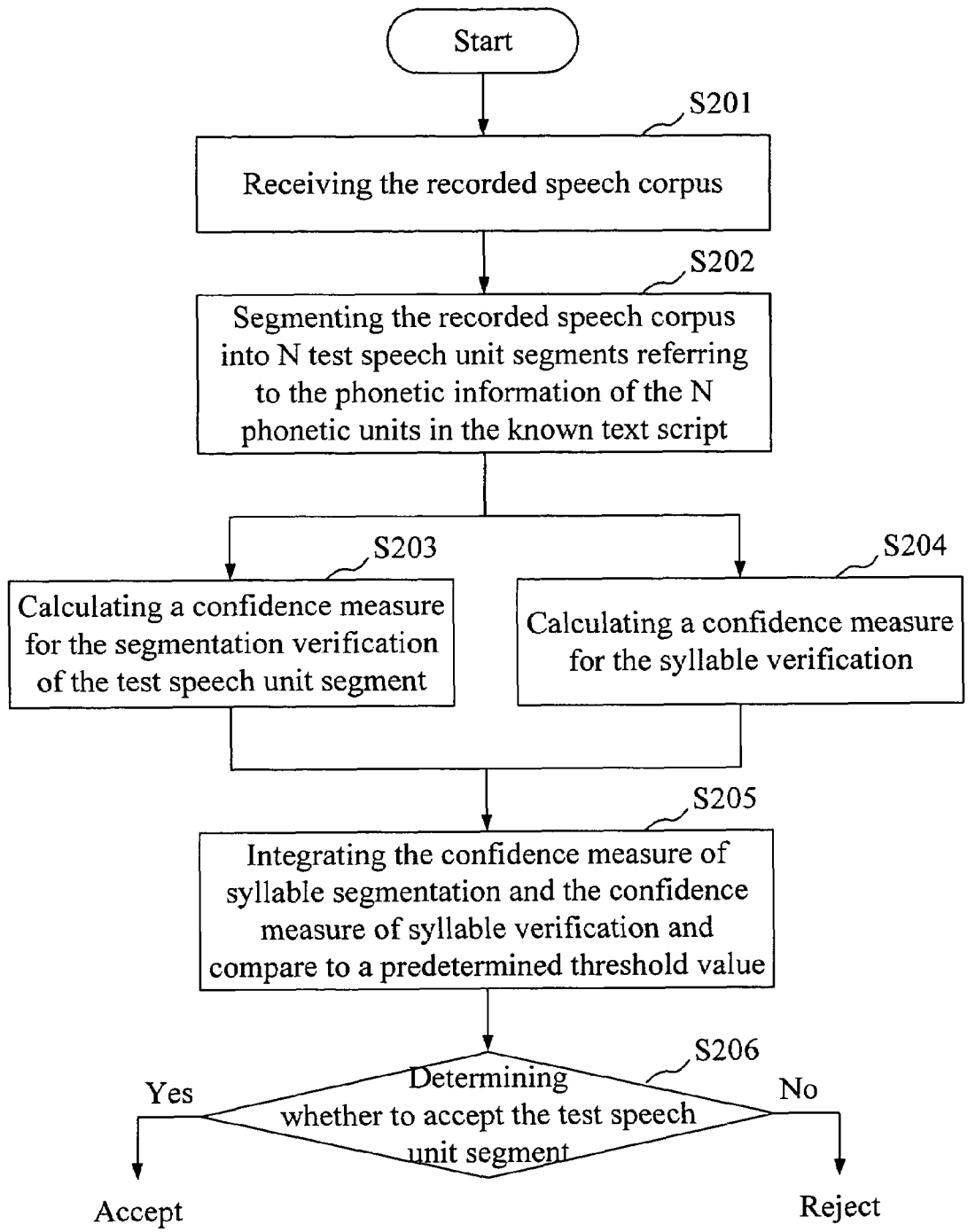
FIG. 2 is a flowchart of the embodiment of the present invention.

Please refer to FIG. 2. FIG. 2 is a flowchart of the computer system 1 of the present invention. The computer system 1 receives the recorded speech corpus R corresponding to the known text script K and stores it in the database 11 (step 201).

The speech unit segmentor 12 segments the recorded speech corpus R into N test speech unit segments 121 referring to the phonetic information of the N phonetic units in the known text script K stored in the database 11 (step 202) to obtain cutting point information for every test speech unit segment 121.

Figure 3:
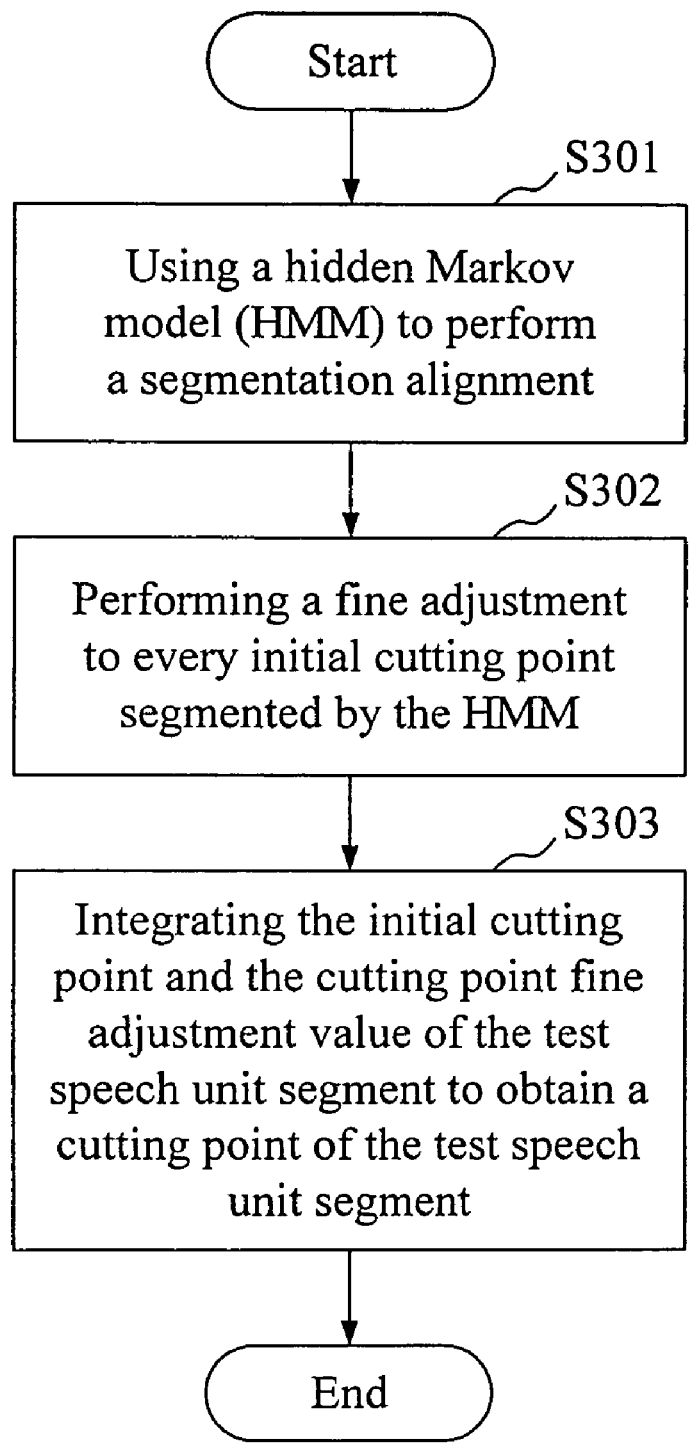
FIG. 3 is a flowchart of a segmentation process of the embodiment of the present invention.

Please refer to FIG. 3. FIG. 3 is a flowchart of a segmentation process of the embodiment of the present invention. In order to make sure the test speech unit segments 121 maintain the phonetic features of continuous speech, the speech unit segmentor 12 uses a hidden Markov model (HMM) to perform a segmentation alignment (step 301) to approximately segment the recorded speech corpus R into N test speech unit segments 121. Every N test speech unit segment 121 has an initial cutting point. An analysis window of the hidden Markov model has a window length of 20 ms and a window shift of 10 ms. The feature vector has 26 dimensions including 12 Mel-scale cepstral coefficients (MFCC), 12 delta-cepstral coefficients, 1 delta-log-energy, and 1 delta-delta-log-energy. The embodiment uses speaker-independent HMMs as the initial models for training the speaker-dependent HMMs.

Next, a fine adjustment is performed to every initial cutting point segmented by the hidden Markov model (step 302) to obtain a more precise cutting fine adjustment value according to some feather factors such as different unit type, speech feature data and search range. Some feather factors like a neighboring cutting point of the initial cutting point, a zero crossing rate (ZCR) of the test speech unit segments 121 and an energy of the test speech unit segments 121 can uses a window with a 5 ms length and a 1 ms shift. The energies are band-pass and high-pass signals of the test speech unit segments 121 which were obtained on a speaker-dependent band. The boundaries of Mandarin syllables, initials and finals are obtained from the state-level boundaries. As mentioned, most of the syllable boundaries are not accurate enough and need to be appropriately adjusted.

Because the segmentation is designed for a TTS system, the philosophy behind the system is how well the segmented speech can be used for concatenation. This refers to not only the accuracy of the segmentation but also concerns how "normal" the syllable after segmentation is. Therefore, the initial cutting point and the cutting point fine adjustment value of the test speech unit segment 121 are integrated to obtain a cutting point of the test speech unit segment (step 303). However, the initial cutting point and the cutting point fine adjustment value of the test speech unit segment 121 may be integrated according to different factors, such as a different priority according to an expert's opinion, or an average opinion of disagreement among different results from multiple sources; or each cutting point fine adjustment value is provided a weighted value, and the cutting point of the test speech unit segment is a weighted average of the initial cutting point and the cutting point fine adjustment value. In addition, a duration statistics for different initials, finals, and syllable types, or an energy statistic for different initials, finals, and inter-syllable segments, or a ZCR statistic for different initials can also affect the integration.

Please refer again to FIG. 1 and FIG. 2. After obtaining the cutting point information of the test speech unit segment 121, the computer system 1 separately sends the cutting point information of the test speech unit segment 121 to the segmental verifier 13 and the phonetic verifier 14 to be verified to assure a phonetic consistency between the syllables in the recorded speech corpus R and the syllables in the known text script K. The segmental verifier 13 verifies a confidence measure for the segmentation verification (CMS) of the test speech unit segment 121 (step 203), which determines whether the cutting point of the test speech unit segment 121 is correct according to various phonetic statistical factors to determine a boundary of the test speech unit segment 121. The phonetic verifier 14 verifies a confidence measure for the syllable verification (CMV) of the test speech unit segment 121 (step 204), which determines whether the test speech unit segment 121 corresponds to the known text script K. The above-mentioned step 203 and step 204 are preferably performed at the same time or, their performance sequence may be switched.

The confidence measure for the segmentation verification can be defined as:

$$CMS = \max\left(1 - h(D) - \sum_{s,f} g(c(s), f(s)), 0\right),$$

and the item h(D) is the disagreement function, which can be defined as $$h(D) = K\left(\sum_i w_i |d_i - \bar{d}|\right) \left(\text{or } h(D) = K\left(\sum_i w_i (d_i - \bar{d})^2\right)\right),$$

where D is a vector of multiple expert decisions of the cutting point of the test speech unit segment 121, $d_i$ is the cutting point, and $\bar{d}=p(D)$ is a final decision of the cutting point determined by the priority, average value or weighted value; K(x) is a monotonically increasing function that maps a non-negative variable x into a value between 0 and 1. The function h(D) is used to verify an inconsistency among multiple decision points in a multiple expert system. A high inconsistency means a low confidence measure for the syllable verification g(c(s), f(s)) is a cost function value between a cost function ranging from 0 to 1, s is a segment, c(s) is a type category of the segment s and, f(s) are acoustic features of the segment (including a zero crossing rate, duration, energy, and periodicity) of the segment, respectively. Therefore, the confidence measure for the syllable verification CMS in this embodiment is between 0 (a lowest confidence measure) and 1 (a highest confidence measure). During the calculation, if there is any unconfident measure the CMS is reduced down to 0. The unconfident measure can be a distinction of the cutting position. For example, if the segmented test speech unit segment 121 is expected to be fricative which will has a higher ZCR, but is actually a silence, and an actual ZCR is not as high as it was expected, then this will cause a calculated cost to become larger and reduce the confidence measure.

The phonetic verifier 14 performs automatic syllable verification according to a discriminative utterance verification for non-keyword rejection in the field of speech recognition. The phonetic verifier 14 uses a syllable model and an anti-model for each syllable type for every syllable to combine a phonetic verification model. The syllable model is trained for verifying the possibility of the test speech unit segment 121 meeting the target syllable type. The anti-model, on the other hand, is trained for verifying the possibility of the test speech unit segment 121 not meeting the target syllable type. Since the method of training the syllable model and the anti-model is well known to those familiar with this field, no further description is required. Consequently, the phonetic verifier 14 can obtain:

$$CMV = \min\{LLR_I, LLR_F, 0\},$$

$$\text{where,} \begin{cases} LLR_I = \log P(X_I | H_0) - \log P(X_I | H_1) \\ LLR_F = \log P(X_F | H_0) - \log P(X_F | H_1) \end{cases},$$

$X_I$ is the initial segment of the test speech unit segment, $X_F$ is the final segment of the test speech unit segment 121, $H_0$ is null hypothesis of the test speech unit segment 121 recorded correctly, $H_1$ is alternative hypothesis of the test speech unit segment 121 recorded incorrectly, and LLR is a log likelihood ratio.

The segmental verifier 13 in this embodiment can not only verify the cutting position but also partly verify a confidence measure for phonetics. When the recorded speech corpus R is incorrect, the related feature factor will be wrong. Furthermore, the phonetic verifier 14 can not only verify phonetic content but also the cutting position. Because, when the cutting position is wrong, the phonetic verification will have a larger mistake, which reduce the confidence measure for the syllable verification (CMV).

Finally, the speech unit inspector 15 integrates the confidence measure of syllable segmentation (CMS) and the confidence measure of syllable verification (CMV) and compare to a predetermined threshold value (step 205) to determine whether to accept the test speech unit segment 121 (step 206). The speech unit inspector 15 can choose an early decision method or a late decision method to compare the confidence measure of syllable segmentation (CMS) and the confidence measure of syllable verification (CMV) of the test speech unit segment 121. The early decision method has two different methods; the first method separately compares the confidence measure of syllable segmentation (CMS) and the confidence measure of syllable verification (CMV) to the threshold value, and only accepts the test speech unit segment 121 in the speech corpus if both of the confidence measures are larger than the threshold value; for the second method, if one of the confidence measures is larger than the threshold value, the test speech unit segment 121 is accepted. The late decision method standardizes the confidence measure of syllable segmentation (CMS) and the confidence measure of syllable verification (CMV), and gives different weighted values to different confidence measures to calculate a signal confidence measure that is compared to the threshold value for the decision.

The present invention provides automatic speech segmentation, segmentation integration and a novel phonetic verification process to obtain correct cutting positions and to detect problematic speech segments, which largely reduces human labor in construction, and increases the quality of the speech corpus.

Although the present invention has been explained in relation to its preferred embodiment, it is to be understood that many other possible modifications and variations can be made without departing from the spirit and scope of the invention as hereinafter claimed.

What is claimed is:

1. An automatic speech segmentation and verification method for segmenting into speech unit segments and verifying said speech unit segments by determining which phonetic units defined by a known text script are to be accepted for output, said phonetic units accepted for output being used for speech synthesis, comprising:

a retrieving step, for retrieving the recorded speech corpus, the recorded speech corpus corresponding to the known text script, the known text script defining phonetic information with N said phonetic units;

a segmenting step, for segmenting the recorded speech corpus into N test speech unit segments referring to the phonetic information of the N phonetic units in the known text script;

a segment-confidence-measure verifying step, for verifying segment confidence measures of all N cutting points of the N test speech unit segments to determine if the cutting points of the N test speech unit segments are correct;

a phonetic-confidence-measure verifying step, for verifying phonetic confidence measures of the test speech unit segments to determine if the test speech unit segments correspond to the known text script; and a determining step, for determining acceptance of the phonetic unit by comparing a combination of the segment confidence measures and the phonetic confidence measures of the test speech unit segments to a predetermined threshold value; wherein if the combined confidence measure is greater than the predetermined threshold value, the phonetic unit is accepted for output.

2. The method as claimed in claim 1, wherein the segmenting step further comprises:

using a hidden Markov model (HMM) to cut the recorded speech corpus into N test speech unit segments referring to the phonetic information of the N phonetic units in the known text script, wherein each test speech unit segment is defined as correspondingly having an initial cutting point;

performing a fine adjustment on the initial cutting point of the test speech unit segment according to at least one feature factor corresponding to each test speech unit segment and calculating at least one cutting point fine adjustment value corresponding to each test speech unit segment; and integrating the initial cutting point and the cutting point fine adjustment value of the test speech unit segment to obtain a cutting point of the test speech unit segment.

3. The method as claimed in claim 2, wherein the feature factor of the test speech unit segment is a neighboring cutting point of the initial cutting point.

4. The method as claimed in claim 2, wherein the feature factor of the test speech unit segment is a zero crossing rate (ZCR) of the test speech unit segment.

5. The method as claimed in claim 2, wherein the feature factor of the test speech unit segment is an energy value of the test speech unit segment.

6. The method as claimed in claim 5, wherein the energy value is an energy value of a band pass signal and a high pass signal retrieved from a speaker-dependent band.

7. The method as claimed in claim 2, wherein each cutting point fine adjustment value has a weighted value, and the cutting point of the test speech unit segment is a weighted average of the initial cutting point and the cutting point fine adjustment value.

8. The method as claimed in claim 1, wherein in the segment-confidence-measure step, each segment confidence measure of the test speech unit segment is:

$$CMS = \max\left(1 - h(D) - \sum_{s,f} g(c(s), f(s)), 0\right),$$

where $$h(D) = K\left(\sum_i w_i |d_i - \overline{d}|\right),$$

D is a vector of multiple expert decisions of the cutting point, $d_i$ is the cutting point, $\overline{d}=p(D)$ is a final decision of the cutting point, K(x) is a monotonically increasing function that maps a non-negative variable x into a value between 0 and 1, g(c(s), f(s)) is a cost function value between a cost function ranging from 0 to 1, s is a segment, c(s) is a type category of the segment s and, f(s) are acoustic features of the segment.

9. The method as claimed in claim 1, wherein in the phonetic-confidence-measure step, each phonetic confidence measure of the test speech unit segments is:

CMV=min{$LLR_I$, $LLR_F$, 0}, where $\begin{cases} LLR_I = \log P(X_I | H_0) - \log P(X_I | H_1) \\ LLR_F = \log P(X_F | H_0) - \log P(X_F | H_1) \end{cases}$, $X_I$ is an initial segment of the test speech unit segment, $X_F$ is a final segment of the test speech unit segment, $H_0$ is a null hypothesis of the test speech unit segment recorded correctly, $H_1$ is an alternative hypothesis of the test speech unit segment recorded incorrectly, and LLR is a log likelihood ratio.

10. An automatic speech segmentation and verification system comprising:

a database for storing a known text script and a recorded speech corpus corresponding to the known text script, and the known text script has phonetic information with N speech unit segment wherein N is a positive integer;

a speech unit segmentor for segmenting the recorded speech corpus into N test speech unit segments referring to the phonetic information of the known text script;

a segmental verifier for verifying segment confidence measures of all cutting points of the N test speech unit segments to determine whether the cutting points of the N test speech unit segments are correct;

a phonetic verifier for obtaining a confidence measure of segment verification by using verification models for verifying whether the recorded speech corpus is correctly recorded; and a speech unit inspector for integrating the confidence measure of speech unit segmentation and the confidence measure of segment verification to determine whether the test speech unit segment is accepted.

11. The system as claimed in claim 10, wherein the segmental verifier performs the following steps:

using a hidden Markov model (HMM) to cut the recorded speech corpus into N test speech unit segments referring to the phonetic information of the N phonetic units in the known text script, wherein each test speech unit segment is defined as correspondingly having an initial cutting point;

performing a fine adjustment on the initial cutting point of the test speech unit segment according to at least one feature factor corresponding to each test speech unit segment and calculating at least one cutting point fine adjustment value corresponding to each test speech unit segment; and integrating the initial cutting point and the cutting point fine adjustment value of the test speech unit segment to obtain a cutting point of the test speech unit segment.

12. The system as claimed in claim 11, wherein the feature factor of the test speech unit segment is a neighboring cutting point of the initial cutting point.

13. The system as claimed in claim 11, wherein the feature factor of the test speech unit segment is a zero crossing rate (ZCR) of the test speech unit segment.

14. The system as claimed in claim 11, wherein the feature factor of the test speech unit segment is an energy value of the test speech unit segment.

15. The system as claimed in claim 14, wherein the energy value is an energy value of a band pass signal and a high pass signal retrieved from a speaker-dependent band.

16. The system as claimed in claim 11, wherein each cutting point fine adjustment value has a weighted value, and the cutting point of the test speech unit segment is a weighted average of the initial cutting point and the cutting point fine adjustment value.

17. An automatic speech segmentation and verification system comprising:

a database for storing a known text script and a recorded speech corpus corresponding to the known text script, and the known text script has phonetic information with N speech unit segment wherein N is a positive integer;

a speech unit segmentor for segmenting the recorded speech corpus into N test speech unit segments referring to the phonetic information of the known text script;

a segmental verifier for verifying segment confidence measures of all cutting points of the N test speech unit segments to determine whether the cutting points of the N test speech unit segments are correct;

a phonetic verifier for obtaining a confidence measure of segment verification by using verification models for verifying whether the recorded speech corpus is correctly recorded; and a speech unit inspector for integrating the confidence measure of speech unit segmentation and the confidence measure of segment verification to determine whether the test speech unit segment is accepted, wherein each segment confidence measure of the test speech unit segment is determined by:

$$CMS = \max\left(1 - h(D) - \sum_{s,f} g(c(s), f(s)), 0\right),$$

where $$h(D) = K\left(\sum_i w_i |d_i - \bar{d}|\right),$$

D is the vector of multiple expert decisions of the cutting point, $d_i$ is the cutting point, $\bar{d}=p(D)$ is a final decision of the cutting point, $K(x)$ is a monotonically increasing function that maps a non-negative variable x into a value between 0 and 1, $g(c(s), f(s))$ is a cost function value between a cost function ranging from 0 to 1, s is a segment, $c(s)$ is the type category of the segment s and, $f(s)$ is the acoustic feature of the segment.

18. An automatic speech segmentation and verification system comprising:

a database for storing a known text script and a recorded speech corpus corresponding to the known text script, and the known text script has phonetic information with N speech unit segment wherein N is a positive integer;

a speech unit segmentor for segmenting the recorded speech corpus into N test speech unit segments referring to the phonetic information of the known text script;

a segmental verifier for verifying segment confidence measures of all cutting points of the N test speech unit segments to determine whether the cutting points of the N test speech unit segments are correct;

a phonetic verifier for obtaining a confidence measure of segment verification by using verification models for verifying whether the recorded speech corpus is correctly recorded; and a speech unit inspector for integrating the confidence measure of speech unit segmentation and the confidence measure of segment verification to determine whether the test speech unit segment is accepted, wherein each phonetic confidence measure of the test speech unit segments is determined by:

$$CMV = \min\{LLR_I, LLR_F, 0\},$$

where 
$$\begin{cases} LLR_I = \log P(X_I | H_0) - \log P(X_I | H_1) \\ LLR_F = \log P(X_F | H_0) - \log P(X_F | H_1) \end{cases},$$

$X_I$ is initial segment of the test speech unit segment, $X_F$ is final segment of the test speech unit segment, $H_0$ is a null hypothesis of the test speech unit segment recorded correctly, $H_1$ is an alternative hypothesis of the test speech unit segment recorded incorrectly, and LLR is a log likelihood ratio.

* * * * *